United States Patent
Friedrich

(10) Patent No.: US 7,986,653 B2
(45) Date of Patent: Jul. 26, 2011

(54) WIRELESS DATA TRANSMISSION BETWEEN BASE STATION AND TRANSPONDER WITH TRANSMISSION PARAMETER ADJUSTED BASED ON TRANSPONDER OPERATING INFORMATION

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 2048 days.

(21) Appl. No.: 10/896,674

(22) Filed: Jul. 21, 2004

(65) Prior Publication Data

US 2005/0053024 A1    Mar. 10, 2005

(30) Foreign Application Priority Data

Jul. 23, 2003    (DE) .................................. 103 35 003

(51) Int. Cl.
*H04B 7/185* (2006.01)
*H04B 5/00* (2006.01)
*H04W 4/00* (2009.01)
*H03C 1/52* (2006.01)
*H03C 1/62* (2006.01)
*H03C 7/00* (2006.01)
*G08B 13/14* (2006.01)

(52) U.S. Cl. ..... 370/313; 455/106; 455/108; 455/115.1; 455/115.2; 455/41.1; 370/338; 370/328; 370/572.1; 375/315

(58) Field of Classification Search .................. 455/106, 455/108, 115.1, 115.2, 41.1–43; 370/313, 370/338, 328; 340/572.1; 375/315
See application file for complete search history.

(56) References Cited

U.S. PATENT DOCUMENTS

| 4,837,779 | A | * | 6/1989 | Lundgren ..................... 375/224 |
| 5,598,169 | A | * | 1/1997 | Drabeck et al. ............... 343/701 |
| 5,754,651 | A | | 5/1998 | Blatter et al. |
| 5,838,873 | A | | 11/1998 | Blatter et al. |
| 6,044,333 | A | | 3/2000 | Stobbe et al. |
| 6,130,623 | A | | 10/2000 | MacLellan et al. |
| 6,466,609 | B2 | | 10/2002 | Koslar et al. |

(Continued)

FOREIGN PATENT DOCUMENTS

DE    197 10 972    10/1998

(Continued)

OTHER PUBLICATIONS

U.S. Appl. No. 10/503,256, filed Aug. 30, 2004, Ulrich Friedrich.

*Primary Examiner* — Ariel Balaoing
(74) *Attorney, Agent, or Firm* — Baker Botts L.L.P.

(57) ABSTRACT

Data encoded in packets modulated onto a carrier wave is transmitted between a base station and a transponder. Each packet includes a header section that contains at least a reference symbol and that serves for adjusting one or more transmission parameters, and a further section such as a data section. The transponder transmits data back to the base station through modulation and backscattering of the carrier wave. During the transmission of the header section by the base station, the transponder transmits transponder operating information relating to the processing of data to be received and/or transmitted by the transponder, by corresponding modulation and backscattering of the carrier wave. In response to and dependent on the received transponder operating information, the base station adjusts at least one transmission parameter, whereby the highest data transmission rate within the capabilities of the particular transponder can be achieved.

19 Claims, 1 Drawing Sheet

U.S. PATENT DOCUMENTS

| | | | |
|---|---|---|---|
| 6,480,100 B1 * | 11/2002 | Frieden et al. | 340/10.1 |
| 6,830,181 B1 * | 12/2004 | Bennett | 235/440 |
| 6,836,208 B2 | 12/2004 | Kuttruff et al. | |
| 6,882,826 B2 * | 4/2005 | Hediger et al. | 455/41.1 |
| 7,072,307 B2 | 7/2006 | Tong et al. | |
| 7,142,815 B2 | 11/2006 | Desjeux et al. | |
| 2002/0136157 A1 * | 9/2002 | Takaoka et al. | 370/208 |
| 2003/0133435 A1 * | 7/2003 | Friedrich | 370/349 |
| 2004/0033782 A1 * | 2/2004 | Horng et al. | 455/69 |
| 2005/0018639 A1 | 1/2005 | Friedrich et al. | |

FOREIGN PATENT DOCUMENTS

| | | |
|---|---|---|
| DE | 197 44 781 | 4/1999 |
| DE | 697 02 493 | 12/2000 |
| DE | 199 33 816 | 1/2001 |
| DE | 101 38 217 | 3/2003 |
| DE | 102 04 347 | 8/2003 |

* cited by examiner

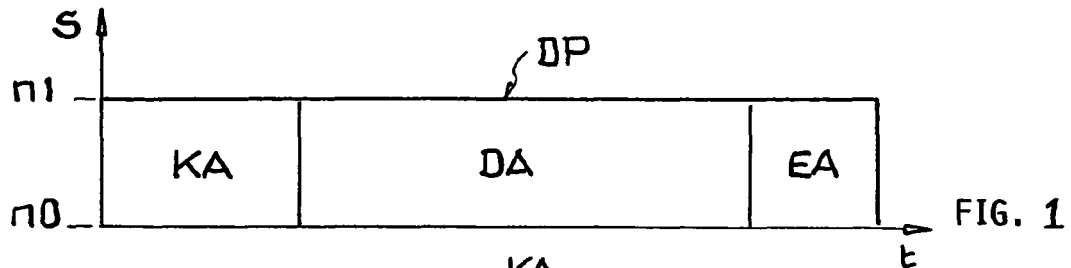
FIG. 1
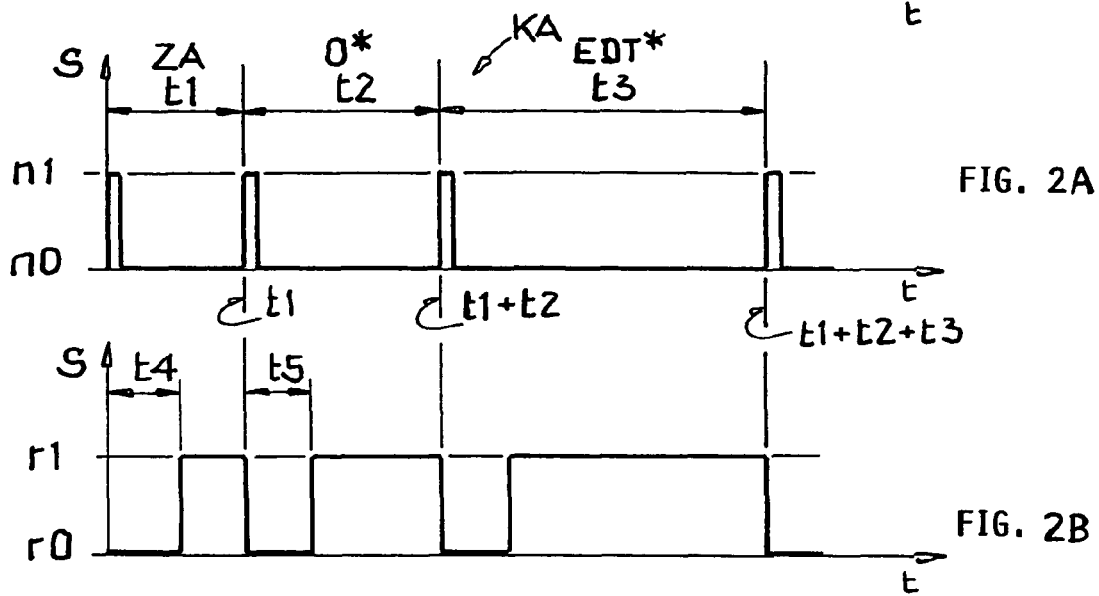
FIG. 2A
FIG. 2B
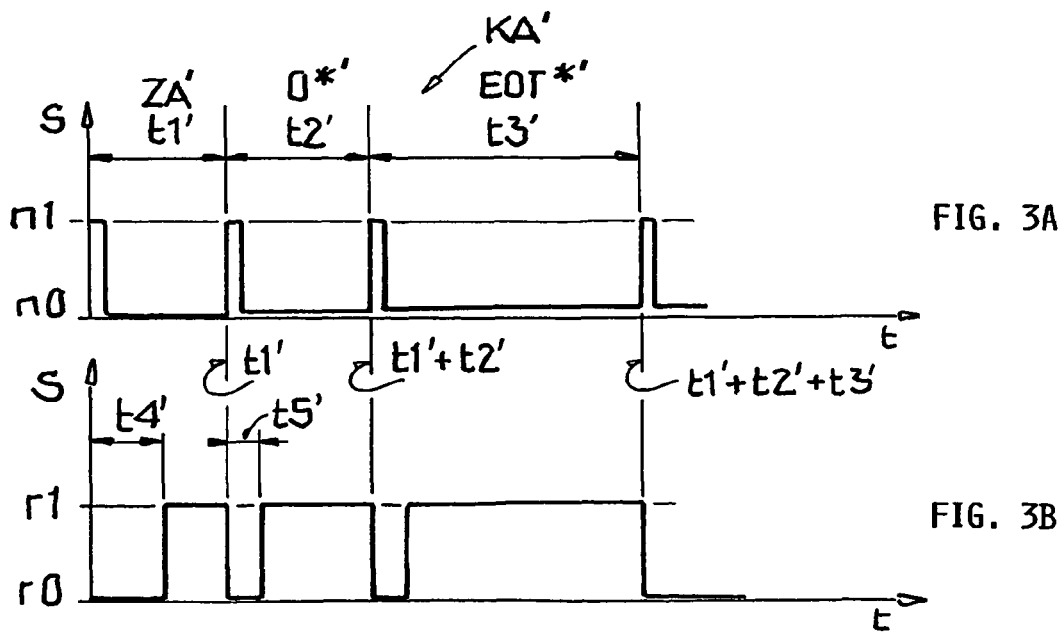
FIG. 3A
FIG. 3B

WIRELESS DATA TRANSMISSION BETWEEN BASE STATION AND TRANSPONDER WITH TRANSMISSION PARAMETER ADJUSTED BASED ON TRANSPONDER OPERATING INFORMATION

CROSS-REFERENCE TO RELATED APPLICATION

This application is related to U.S. application 10/896,670 filed Jul. 21, 2004, now U.S. Pat. 7,376,391 issued May 20, 2008. The entire disclosure of the related application is incorporated herein by reference.

PRIORITY CLAIM

This application is based on and claims the priority under 35 U.S.C. §119 of German Patent Application 103 35 003.9, filed on Jul. 23, 2003, the entire disclosure of which is incorporated herein by reference.

FIELD OF THE INVENTION

The invention relates to a method for carrying out wireless data transmission between a base station and a transponder, especially a passive transponder, wherein data packets that each include a header section with at least one symbol and at least one further section are modulated onto electromagnetic carrier waves transmitted between the base station and the transponder.

BACKGROUND INFORMATION

Transmission methods of the above mentioned general type forming the general field of this invention, between one or more base stations or reader devices and one or more transponders, are typically used for contactless identification systems, or particularly so-called radio frequency identification (RFID) systems, for example. It is also possible to integrate one or more sensors, for example for carrying out a temperature measurement, on the transponder. Such transponders are referred to as remote sensors. In this context, the transponder or remote sensor transmits, or especially backscatters, identification information or sensor information in a contactless manner from the transponder or sensor to the base station or reader device. Throughout this specification, the general term "transponder" should be understood to cover both passive and semi-passive transponders, as well as remote sensors that include sensor elements integrated in or connected to a transponder.

Such transponders, or particularly the receiving/backscattering or receiving/transmitting circuit arrangements thereof, typically do not include an active transmitter for actively transmitting the relevant data to the base station. Instead, the transponders are non-active systems that can be designated as passive systems if they do not comprise their own power supply, or as semi-passive systems if they do comprise their own power supply. Especially passive transponders derive the energy necessary for their operation from the electromagnetic field emitted by the base station.

In such non-active systems, the data transmission in the distant or far field of the base station using UHF waves or microwaves generally uses a so-called backscattering or backscatter-coupling between the transponder and the base station. In this regard, the base station emits electromagnetic carrier waves, which are modulated by the receiving/backscattering arrangement of the transponder according to a prescribed modulation process in accordance with the data that are to be transmitted from the transponder to the base station. With this modulation, the waves are then reflected or backscattered from the transponder back to the base station. The typical modulation processes used in this context include amplitude modulation, phase modulation, and amplitude shift keying (ASK) subcarrier modulation in which the frequency or the phase position of the subcarrier is varied.

The prior German Patent Applications DE 102 04 347 and DE 101 38 217 A1 (and its counterpart U.S. Application Publication 2003/0133435 A1, the disclosure of which is incorporated herein by reference) disclose methods for carrying out a wireless data transmission between a base station and a transponder, in which data packets to be transmitted each comprise a header section, a data section including the useful data to be transmitted, and an end section. The useful data to be transmitted are encoded and transmitted through the use of suitable defined symbols that are identified in the header section of the data packet.

In this regard, a symbol serves for the definition or interpretation of the value of a character in the character sequence representing or embodying the data being transmitted. Such a symbol is typically represented or defined in connection with a time duration between two successive field gaps or so-called "notches" in the header section of the data packet. Such a field notch can be achieved or generated, for example in connection with an amplitude modulation, by the suppressing or damping of the carrier signal. Alternatively, as another example in the context of a double or dual sideband modulation, such a field notch can be generated by switching over the phase position of the carrier signal. The transponder decodes the received data packets on the basis of the symbols contained and defined in the header section, more particularly in connection with the time durations that have been respectively allocated to the respective symbols. For determining the value of a respective character, the transponder compares the determined time duration of the respective character with the time durations of the symbols as defined in the header section of the data packet.

Through the selection of the time intervals or particularly the time durations respectively allocated to the respective symbols, it is possible to adapt the transmission rate to the prevailing transmission conditions within a certain transmission rate range. This range of the transmission rate is limited, among other things, by the point at which the transponder, or rather particularly the encoding/decoding unit provided in the transponder for this purpose, can no longer resolve or distinguish the time differences between various different time durations that are respectively allocated to the symbols or characters. In this regard, a higher time resolution capability generally goes along with a higher current consumption of the transponder, for example because it is necessary to increase the clock frequency of a counter used for the time duration determination, or the charging current of a functionally corresponding analog RC-stage in the encoding/decoding unit.

Because a rather low power density prevails in the far field of the electromagnetic waves emitted by the base station, and this power density serves for the power supply of the transponder (especially the passive transponder), the achievable transmission distance or range is reduced as the current consumption of the transponder increases. The parameter or parameters determining the encoding or the decoding, or especially the encoding/decoding unit, is thus typically statically configured in such a manner so as to achieve a sufficient compromise between the capability of a high time resolution and conditional thereon also a high achievable transmission rate on the one hand, and a low current consumption on the other hand.

Due to process tolerances during the fabrication of transponders, as well as a temperature dependence of various operating parameters of oscillators used in transponders for carrying out the data transmission, such factors lead to a rather broad scattering of the capability of various individual transponders to process data to be received and/or transmitted. Particularly, there is an inconsistency or scattering of the time resolution capability of individual transponders to resolve or distinguish the time differences between the symbols and/or characters, i.e. between the distinct time durations of the various symbols and/or characters, being transmitted. Such scattering of the operating parameters especially affects transponders that are constructed without external components.

Thus, several individual transponders, of the same transponder type or model, will exhibit significant differences in their operating parameters or capabilities in receiving, transmitting, and/or processing the data. In order to accommodate such differences among different transponders that a base station might be expected to communicate with, the base station must have its transmission characteristics set to the "worst case" scenario, namely to successfully communicate with the transponder having the worst operating parameters among the known or expected scattering range of the total production of transponders. This is so because conventionally, the base station does not have or receive any information regarding the operating capabilities of the particular transponder with which a communication is being carried out or to be carried out. Thus, the base station must be pre-set to carry out the communication in such a manner so that even the worst or least-capable individual transponder among an entire batch, model, or type of transponders will be able to successfully receive and process the data transmitted by the base station. Unfortunately, this means that the base station must transmit the data at a slower data transmission rate than would be necessary for other transponders of the same batch, type or model, which have better than worst-case operating capabilities.

SUMMARY OF THE INVENTION

In view of the above, it is an object of the invention to provide a method for wireless data transmission between a base station and a transponder with a relatively large achievable transmission distance throughout a large transmission rate range in comparison to the prior art, with an optimized power requirement and with relatively low effort and expense. It is another object of the invention to provide such a method which allows the transmission characteristics to be adapted to the capabilities of the respective transponder with which a communication is being carried out, especially allowing such an adaptation to be made "on the fly" during the communication. The invention further aims to avoid or overcome the disadvantages of the prior art, and to achieve additional advantages, as apparent from the present specification. The attainment of these objects is, however, not a required limitation of the present claimed invention.

The above objects have been achieved according to the invention in a method of wireless data transmission between a base station and a transponder, especially a passive transponder. In the inventive method, an electromagnetic carrier wave (including one or more electromagnetic carrier waves) is emitted by the base station. Data to be transmitted from the base station to the transponder are organized and transmitted in the form of data packets, which are modulated onto the electromagnetic carrier wave. These data packets each respectively include a header section that serves for adjusting or setting one or more transmission parameters, and at least one further section such as a data section or end section. Additionally, further data are transmitted from the transponder to the base station through modulation and backscattering of the electromagnetic carrier wave that was emitted from the base station to the transponder.

Further particularly according to invention, during the transmission of the header section of a data packet from the base station to the transponder, the transponder transmits transponder operating information to the base station through corresponding modulation and backscattering of the carrier wave. The transponder operating information transmitted in this manner from the transponder to the base station is information that relates to or particularly is indicative of at least one property of the processing of data to be received and/or transmitted by the transponder. The term transponder operating information(s) in the context of the invention covers all informations relating to the transponder's processing or capability of processing data that are to be received and/or transmitted by the transponder. As an example, the transponder operating information may be the time resolution capability of the transponder, such as represented by the oscillator frequency or one or more parameters of an analog time measuring arrangement.

Next, the base station receives the transponder operating information, and adjusts at least one transmission parameter in response to and dependent on this transponder operating information. The base station then carries out or continues the transmission according to the new adjusted transmission parameter.

The inventive method achieves an adjustment of the base station transmission parameter or parameters in response to and dependent on actual transponder operating information provided by the particular transponder that is participating in the communication with the base station. Thus, the inventive method makes it possible to adapt the transmission characteristics or properties defined in the header section of a data packet to the specific capacity or operating capability of the activated transponder. In this regard, the invention replaces the typical control mechanism without feedback-coupling from the transponder to the base station, in which the transmission characteristics defined in the header section are adjusted or set independently of the operating capabilities of the transponder to be activated, by a control mechanism that is feedback-coupled and thus regulated even in a closed-loop fashion based on the actual operating information of the particular transponder participating in the communication, whereby the header section, or particularly one or more transmission parameters can be adjusted based on, i.e. in response to and dependent on, the transponder operating information.

In a further detailed embodiment of the inventive method, the transponder operating information may comprise or relate to the time resolution capability of the transponder, and especially an oscillator frequency of a timing oscillator or one or more parameters of an analog time measuring arrangement. This makes it possible to achieve a transponder-dependent and transponder-selective adjustment by the base station of those transmission parameters that are dependent on the time resolution capability of the transponder, for example the transmission rate. In other words, if the transponder is capable of receiving and processing data at a higher transmission rate due to a higher time resolution capability of this transponder, then the base station can accordingly increase the data transmission rate adapted to the capabilities of the transponder.

In yet another detailed embodiment of the inventive method, the transponder operating information indicates or represents a minimum time duration required for the successful or reliable processing of a character, e.g. a data encoding character, by the transponder, whereby such data encoding characters are contained in the further section of the respective data packet. This makes it possible for the base station to carry out a targeted or custom-tailored adjustment of one or more transmission parameters in response to and dependent on the decoding or data processing capacity of the activated transponder.

According to a further preferred feature of the inventive method, a transmission parameter of the transmission by the base station defines a time duration that serves for encoding and/or decoding the value or significance (e.g. the bit value 0 or 1) of a character that is contained in the at least one further section, e.g. the data section, of the respective data packet. This makes it possible for the base station to carry out a targeted or custom-tailored adjustment of a character time duration in the further section of the data packet, and thus correspondingly carry out an adjustment of the data transmission rate, in response to and dependent on the data processing speed or throughput capacity of the activated transponder.

According to another advantageous detailed embodiment of the inventive method, the header section contains a first symbol as a reference symbol, of which the time duration is determined by the transponder. Then, the transponder adjusts or sets the time resolution of the encoding and/or decoding in response to and dependent on the determined time duration of the first/reference symbol. Particularly, this time resolution can be represented and determined by an oscillator frequency of a timing oscillator or one or more parameters of an analog time measuring arrangement. Advantageously, during the transmission of the first/reference symbol in the header section of the data packet by the base station, the transponder generates a backscattered signal including a first signal feature modulated thereon, which is backscattered from the transponder back to the base station. Upon receiving this backscattered signal, the base station determines the time delay between the beginning of the first symbol in the header section of the transmitted data packet and the beginning of the characteristic first signal feature of the backscattered signal. The base station then adjusts the time duration of the first symbol being transmitted by the base station in response to and dependent on the determined time delay.

This makes it possible to achieve a transponder-dependent and transponder-selective adjustment of the oscillator frequency or the pertinent selected parameter of an analog time measuring arrangement by the base station, because the base station can determine or make a conclusion regarding an oscillator fundamental or base frequency or a basic setting of the analog time measuring arrangement from the determined time delay. The oscillator base frequency, for example, is sharply dependent on the ambient operating temperature of the transponder and/or the process tolerances that arose during the fabrication of this particular transponder.

According to a further feature of the invention, the header section contains at least one second symbol, of which the time duration determines the data transmission rate between the base station and the transponder. Particularly, the time duration of this symbol is used to specify the respective character values of data-encoding characters in the data section of the data packet. During the transmission of the second symbol in the header section of the data packet by the base station, the transponder generates a further second signal feature modulated onto the backscattered signal that is backscattered to the base station. Upon receiving this further backscattered signal, the base station determines the time delay between the beginning of the second symbol being transmitted by the base station and the beginning of the characteristic second signal feature of the backscattered signal. The base station then adjusts the time duration of the second symbol being transmitted in the header section in response to and dependent on the determined time delay. In this manner, for example, the base station is able to detect and recognize a switching-over of the oscillator from one frequency to another frequency in the transponder. For example, this confirms that the transponder has adjusted its reception or data processing capability in response to the time duration of the first/reference symbol and is now ready to receive data at a higher transmission rate. Then, dependent on the time delay detected by the base station, for example, the data transmission rate can be correspondingly adjusted.

BRIEF DESCRIPTION OF THE DRAWINGS

In order that the invention may be clearly understood, it will now be described in connection with example embodiments thereof, with reference to the accompanying drawings, wherein:

FIG. 1 is a schematic diagram representing a data packet for transmitting data in the inventive method, including a header section, a data section, and an end section;

FIG. 2A is a time diagram showing the time course of the signal carrying the header section of a data packet from the base station to the transponder;

FIG. 2B is a time diagram associated with FIG. 2A, but showing the associated backscattered signal that carries transponder operating information and is backscattered from the transponder back to the base station;

FIG. 3A is a further time diagram similar to FIG. 2A showing the time course of a signal carrying a header section of a data packet being transmitted from the base station to the transponder; and FIG. 3B is a further time diagram associated with FIG. 3A, but showing the associated backscattered signal that carries transponder operating information from the transponder back to the base station, when the transponder changes its oscillator frequency during the transmission of the header section.

DETAILED DESCRIPTION OF PREFERRED EXAMPLE EMBODIMENTS AND OF THE BEST MODE OF THE INVENTION

The schematic diagram of FIG. 1 shows a data packet DP that is transmitted from a base station to a transponder. While the base station and the transponder are not illustrated, they may have any conventionally known or future conceived construction and operation. As schematically shown, the data packet DP includes a header section KA, a following data section DA containing the useful data to be transmitted, and a final end section EA, modulated onto a carrier signal having a signal strength S between n0 and n1. For simplicity, FIG. 1 merely schematically shows the envelope of the data packet DP up to the maximum signal strength n1, without showing any of the signal pulses or the like actually making up the modulated signal.

FIG. 2A is a time diagram showing the time course of a portion of the signal strength S of the modulated signal transmitted by the base station, particularly representing the header section KA of a data packet DP according to FIG. 1. FIG. 2B, in connection with FIG. 2A, shows the time course of a signal strength S of a backscattered signal that is modulated with transponder operating information and backscattered from the transponder to the base station, whereby the signal in FIG. 2B is associated with the signal in FIG. 2A respectively on the same time scale. The Y-axis shows the respective signal strength S, which alternates between signal strengths n1 and n0 in the transmitted signal received by the transponder, and between the signal strengths r1 and r0 in the backscattered signal that is backscattered by the transponder. The illustrated header section KA contains three symbols ZA, 0* and EOT*. These symbols, which are essentially defined in the header section KA by their respective time durations, serve for adjusting or setting various transmission parameters, and also for defining or representing respective characters of the data in the data section DA. In this regard, please also see the above mentioned cross-referenced application, of which the entire disclosure is incorporated herein by reference. The symbols ZA, 0* and EOT* are generated or represented by successive field gaps or so-called "notches" of the carrier signal emitted by the base station. In FIG. 2A, these "notches" in the signal strength S are represented as respective short pulses. The respective distinct symbols are defined by the respective different time durations between the successive pulses.

Namely, the first symbol ZA has a time duration t1, the second symbol 0* has a time duration t2, and the third symbol EOT* has a time duration t3. These time durations t1, t2 and t3 are detected and determined by a time acquisition unit in the transponder. Particularly, if the time acquisition unit is embodied as a digital counter circuit, then the counter circuit simply counts during the time duration of each respective symbol, and respective counter values associated respectively with each of the time durations t1, t2 and t3 are stored in an allocated memory. On the other and, if the time acquisition unit is embodied as an RC-circuit, then the RC-circuit charges a capacitor during the time of each respective symbol, and the resulting voltage values of the charged capacitor respectively associated with each of the time durations t1, t2 and t3 are stored in an analog memory.

The first symbol ZA, or particularly its time duration t1, serves for adjusting the clock frequency of the counter circuit, that is to say the sampling frequency thereof, or serves to adjust the charging current of the RC-circuit in the transponder, depending on the particular embodiment of the time acquisition unit.

The symbol 0* or rather its associated time duration t2 serves for encoding and/or decoding the binary characters "0" and "1" which make up the useful data to be transmitted in the data section DA, forming the next successive section of the data packet DP as shown in FIG. 1. In this regard, the data is represented, for example, as a sequence of binary bits. A binary character transmitted and received in the data section DA having a time duration less than the time duration t2 associated with the symbol 0* is interpreted as a "0" in the transponder. On the other hand, a binary character in the data section DA having a time duration greater than t2 and less than the time duration t3 associated with the symbol EOT* is interpreted as a "1".

Furthermore, the symbol EOT* or especially its associated time duration t3 as defined in the header section KA serves to represent or indicate the end of a data packet DP, and for this purpose is transmitted as a corresponding character or information in the end section EA of the data packet DP. In that regard, essentially any desired signal form or forms can be used as long as they are derived from or representative of the time duration t3. If the time duration between two successive field gaps or "notches" in the signal is greater than the time duration t3, then the transponder recognizes the end of this data packet DP.

While the base station is transmitting the signal carrying the data packet DP having the header section KA as shown in FIG. 2A, the transponder is receiving this header section KA. Meanwhile, during this time, the transponder is modulating the received carrier signal and backscattering the resulting modulated signal as shown in FIG. 2B. More particularly, after a time duration t4 relative to the rising flank of the signal pulse of the first field gap or notch in the transmitted signal of FIG. 2A, the transponder switches or alters its modulation state so that the backscattered signal transitions through a rising flank (i.e. a first signal feature) from signal strength r0 to signal strength r1. This time duration t4 is dependent on the oscillator frequency of the counter circuit or the charging current of the RC circuit embodying the time acquisition unit of the transponder. In turn, the oscillator frequency or the charging current is sharply or strongly dependent on the transponder temperature and/or various fabrication tolerances of the transponder that arose during fabrication thereof. So the time duration or delay t4 thus represents or is indicative of this associated transponder operating information.

The backscattered signal of FIG. 2B is received by the base station, which consequently determines and evaluates the time duration t4 to obtain the transponder operating information, e.g. relating to the presently existing actual transponder oscillator frequency or charging current, which depend on the operating temperature and/or the transponder fabrication tolerances as mentioned above. In general, such transponder operating information relates to the transponder's capability to process data that are to be received and/or transmitted by the transponder. More particularly, for example, a time duration or delay t4 represents or indicates the time resolution capability of the transponder for receiving and/or transmitting data. In turn, the time resolution capability directly determines the achievable data transmission rate, because short character durations and short time differences between different characters can be used in the transmission when the time resolution of the receiver (and/or the transmitter) is high.

After receiving the backscattered signal, the base station evaluates the time duration t4 as mentioned above, and in response to and dependent on the time duration t4 then adjusts the time duration t1 of the symbol ZA (so as to trigger an optimal adjustment of the transponder operation as explained below). At the time point t1 (i.e. at the expiration of the time duration t1), the base station transmits the next pulse representing the next field gap or notch indicating the end of the symbol ZA. Upon receiving this rising flank of the next pulse at time t1, the transponder alters its modulation state of the backscattered signal once gain through a falling flank from signal strength r1 to signal strength r0, and also adjusts or sets its oscillator frequency or its charging current of its time acquisition unit in response to and dependent on the determined time duration t1. In the present example of FIGS. 2A and 2B, note that the oscillating frequency or charging current remains unchanged.

After a further time duration or delay t5 in the transponder, the transponder again changes its modulation state so that the backscattered signal now transitions through a rising flank (i.e. a second signal feature) from signal strength r0 to signal strength r1. This backscattered signal, indicative of the time duration or delay t5, provides to the base station information regarding the actual existing time resolution or the time basis (unchanged in this example) with which the transponder is continuing to operate after the processing of the first symbol ZA. Then, in response to and dependent on the time duration t5 as determined in the base station, the base station adjusts or sets the time duration t2 of the symbol 0*. This symbol 0* and especially its associated time duration t2 defines the valid time durations of the binary data encoding characters, and thus effectively directly determines the data transmission rate, because it determines how long it will take to transmit each data character in the data section of the data packet.

FIGS. 3A and 3B are time diagrams similar to FIGS. 2A and 2B, and represent a similar transmission and backscattering sequence as FIGS. 2A and 2B, but in an example in which the transponder changes its oscillator frequency during the transmission of the header section KA. Particularly, FIG. 3A shows a detailed time diagram of the header section KA being transmitted by the base station and received by the transponder, while FIG. 3B shows the associated backscattered signal being backscattered by the transponder to the base station. The reference characters used in FIGS. 3A and 3B generally correspond to the same reference characters in FIGS. 2A and 2B, except for being distinguished and supplemented by a prime mark.

Note that some of the time durations are different in the example of FIGS. 3A and 3B in comparison to the example of FIGS. 2A and 2B, particularly in connection with the change of the oscillator frequency. Namely, the base station has set the time duration t1' of the Symbol ZA' (to call for a suitable adjustment of the transponder operation) in response to the determined time duration or delay t4' in the backscattered signal, as discussed above. Then, the transponder evaluates the time duration t1' associated with the symbol ZA', and in response thereto increases its oscillator frequency or its charging current (depending on the concrete embodiment of the time acquisition unit) as "intended" by the base station. This is confirmed and indicated by the transponder and recognized by the base station, because the time duration or delay t5' between the rising flank of the second field gap or notch in the transmitted signal of FIG. 3A and the rising flank of the modulation change of the backscattered signal from signal strength r0 to signal strength r1 in the backscattered signal of FIG. 3B is reduced or shortened in comparison to the time duration t5 of FIG. 2B.

On the basis of this information (the time duration or delay t5'), the base station recognizes that the transponder has increased its sampling frequency (as intended), and the base station correspondingly adjusts the time duration t2' associated with the symbol 0*' to a smaller value in comparison to the time duration t2 in the operation of FIG. 2A, whereby the data transmission rate is increased.

Accordingly, in this manner, the transponder is able to provide feedback regarding its operating capabilities back to the base station in the form of the transponder operating information modulated in the back scattered signal. and then based on this information the base station adjusts the time duration t1 or t1' of the symbol ZA, so that the transponder in response thereto adjusts its oscillator frequency or charging current, and then indicates this change to the base station in the time duration t5 or t5', whereupon the base station can then increase the data transmission rate by reducing the time duration t2 or t2' of the data encoding symbol 0* or 0*'.

As is made clearly apparent by the illustrated and described example embodiments, the inventive method makes it possible to achieve a transponder-dependent and transponder-selective adjustment of transmission parameters such as the transmission rate, for example, already at the beginning of the transmission of the header section. In this manner, environmental conditions such as the temperature, for example, as well as process variations or tolerances that arose during the transponder fabrication can be taken into account in the transmission parameters. Thus, it is no longer necessary to limit the transmission capacity of the base station to assumed or pre-determined worst-case conditions of a worst example of a transponder. Instead, the base station can carry out the transmission respectively with the best transmission parameters possible within the capabilities of a particular transponder.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of carrying out a wireless data transmission between a base station and a transponder, comprising the following steps:
   a) transmitting first data organized in a data packet from said base station to said transponder, comprising modulating said data packet onto an electromagnetic carrier wave and transmitting said carrier wave with said data packet modulated thereon from said base station to said transponder, wherein said data packet includes a header section containing at least one symbol including a reference symbol, and further includes at least one further section;
   b) receiving said first data, comprising receiving said carrier wave with said data packet modulated thereon, in said transponder;
   c) transmitting second data from said transponder to said base station, comprising modulating and backscattering said carrier wave in accordance with said second data from said transponder;
   d) during said transmitting of said header section of said data packet from said base station to said transponder, transmitting transponder operating information from said transponder to said base station by modulating and backscattering said carrier wave in accordance with said transponder operating information to produce a backscattered signal from said transponder, wherein said transponder operating information is indicative of at least one processing parameter that applies to said receiving of said first data and/or said transmitting of said second data by said transponder;
   e) receiving said transponder operating information in said base station; and
   f) in said base station, in response to and dependent on said transponder operating information, adjusting a transmission parameter that applies to said transmitting of said first data from said base station to said transponder.

2. The method according to claim 1, wherein said processing parameter indicated by said transponder operating information is a time resolution capability of said transponder.

3. The method according to claim 1, wherein said processing parameter indicated by said transponder operating information is an oscillator frequency of a timing oscillator of said transponder.

4. The method according to claim 1, wherein said processing parameter indicated by said transponder operating information is a parameter influencing a time measurement by an analog time measuring arrangement of said transponder.

5. The method according to claim 1, wherein said first data includes encoded data, said at least one further section of said data packet is a data section containing said encoded data that is encoded by an encoding with data characters defined with reference to a respective time duration thereof, said receiving of said first data further comprises decoding said encoded data, and said processing parameter indicated by said transponder operating information is a minimum value of said time duration of said data characters that can be decoded by said transponder.

6. The method according to claim 1, wherein said first data includes encoded data, said at least one further section of said data packet is a data section containing said encoded data that is encoded by an encoding with data characters defined with reference to a respective time duration thereof, said receiving of said first data further comprises decoding said encoded data, and said transmission parameter specifies a value of said time duration by which said data characters are defined for said encoding and/or said decoding.

7. The method according to claim 1,
wherein said step of adjusting a transmission parameter in said base station comprises setting a reference time duration of said reference symbol; and
further comprising:
determining said reference time duration in said transponder, and
adjusting a time resolution of an encoding and/or a decoding of said first data and/or said second data in response to and dependent on said reference time duration in said transponder.

8. The method according to claim 7, wherein said adjusting of said time resolution comprises adjusting an oscillator frequency of a timing oscillator of said transponder in response to and dependent on said reference time duration.

9. The method according to claim 7, wherein said adjusting of said time resolution comprises adjusting a parameter influencing a time measurement by an analog time measuring arrangement of said transponder.

10. The method according to claim 7, wherein:
said transponder operating information is encoded by at least a first signal feature modulated in said backscattered signal by said transponder during said transmitting of said reference symbol by said base station;
said first signal feature exhibits a first time delay after a beginning of said reference symbol; and
said setting of said reference time duration is carried out in response to and dependent on said first time delay of said first signal feature, which is determined in said base station.

11. The method according to claim 10, wherein said first signal feature is a first modulation state change of said backscattered signal.

12. The method according to claim 10, wherein said transponder sets said first time delay dependent on and indicative of an existing oscillator frequency of a timing oscillator or an existing charging current of an analog timing circuit of said transponder before said step of adjusting said time resolution.

13. The method according to claim 10, wherein said at least one symbol in said header section comprises a plurality of symbols including said reference symbol and at least one further symbol, and wherein said reference symbol is a first-occurring one of said symbols in said header section.

14. The method according to claim 10, wherein:
said at least one symbol in said header section further includes a second symbol having a second symbol time duration that determines a data transmission rate of said transmitting of said first data from said base station to said transponder;
said transponder operating information is encoded further by a second signal feature modulated on said backscattered signal by said transponder during said transmitting of said second symbol by said base station;
said second signal feature exhibits a second time delay after a beginning of said second symbol;
said step of adjusting a transmission parameter in said base station further comprises setting said second symbol time duration of said second symbol; and
said setting of said second symbol time duration is carried out in response to and dependent on said second time delay of said second signal feature which is determined in said base station.

15. The method according to claim 14, wherein said second signal feature is a second modulation state change of said backscattered signal.

16. The method according to claim 14, wherein said transponder sets said second time delay dependent on and indicative of an adjusted oscillator frequency of a timing oscillator or an adjusted charging current of an analog timing circuit of said transponder after said step of adjusting said time resolution.

17. The method according to claim 7, wherein:
said at least one symbol in said header section further includes a second symbol having a second symbol time duration that determines a data transmission rate of said transmitting of said first data from said base station to said transponder;
said transponder operating information is encoded by at least a signal feature modulated on said backscattered signal by said transponder during said transmitting of said second symbol by said base station;
said signal feature exhibits a time delay after a beginning of said second symbol;
said step of adjusting a transmission parameter in said base station further comprises setting said second symbol time duration of said second symbol; and
said setting of said second symbol time duration is carried out in response to and dependent on said time delay of said signal feature which is determined in said base station.

18. The method according to claim 1, wherein said transponder operating information is indicative of said at least one processing parameter that applies to said receiving of said first data in said transponder.

19. The method according to claim 1, wherein said transponder operating information is indicative of said at least one processing parameter that applies to said transmitting of said second data by said transponder.

\* \* \* \* \*